United States Patent
Spencer et al.

[19]

[11] Patent Number: 5,814,906
[45] Date of Patent: Sep. 29, 1998

[54] POWER SUPPLY FOR PORTABLE COMPUTERS AND OTHER ELECTRONIC DEVICES

[76] Inventors: Jerald C. Spencer, 212 7th Ave.; Steven D. Marquis, 1419 Boulder Ave., both of Helena, Mont. 59601

[21] Appl. No.: 762,327

[22] Filed: Dec. 9, 1996

[51] Int. Cl.[6] .................................................. H01L 31/045
[52] U.S. Cl. ..................... 307/150; 136/246; 364/708.1
[58] Field of Search ............................... 307/150; 320/2, 320/101; D14/106; 136/245, 251, 246, 291; 361/681; 364/708.1

[56] References Cited

U.S. PATENT DOCUMENTS

| D. 335,868 | 5/1993 | Toedter | D14/106 |
|---|---|---|---|
| D. 356,072 | 3/1995 | Mundt | D14/106 |
| D. 358,374 | 5/1995 | Yamazaki | D14/106 |
| D. 363,473 | 10/1995 | Leman | D14/107 |
| 5,039,928 | 8/1991 | Nishi et al. | 320/2 |
| 5,228,924 | 7/1993 | Barker et al. | 136/246 |
| 5,260,885 | 11/1993 | Ma | 364/708.1 |
| 5,383,138 | 1/1995 | Motoyama et al. | 364/708.1 |
| 5,522,943 | 6/1996 | Spencer et al. | 136/245 |
| 5,523,776 | 6/1996 | Hougham et al. | 345/211 |
| 5,537,343 | 7/1996 | Kikinis et al. | 364/708.1 |

*Primary Examiner*—Richard T. Elms
*Attorney, Agent, or Firm*—Jerry Johnson

[57] ABSTRACT

A power supply for a portable computer or other electronic device of a type having an integral external housing within which the electronic components of the device are encased. The power supply comprises a mounting panel having a front surface and a back surface and side flanges disposed on the mounting panel to permit temporary attachment of the power supply to the housing of an electronic device. The back surface of the mounting panel faces toward the electronic device housing when the power supply is attached to the housing of the electronic device. At least one solar panel is attached to the mounting panel facing away from the electronic device when the power supply is attached to the housing of the electronic device. The solar panel is capable of producing an electrical power output through the conversion of solar energy to electrical energy. A brace is attached to the power supply for selectively positioning the power supply into an upright inclined position and for maintaining the power supply in the inclined position.

12 Claims, 7 Drawing Sheets

POWER SUPPLY FOR PORTABLE COMPUTERS AND OTHER ELECTRONIC DEVICES

BACKGROUND

Portable computers and other electronic devices are now commonly used in remote locations or other locations inconvenient for using conventional electrical supply systems. These remote locations may vary widely. For example, the confines of an airplane or airport terminal encountered by a traveling business person typically do not provide electricity for those desiring to utilize electronic devices. Similarly, a remote location such as a wilderness area would present problems to a research scientist, or park ranger desiring to use an electronics device. An average user of a computer or other electronic device wanting to take the device to a park would face problems using the device away from a power source.

The user of these electronic devices are faced with the obvious problem of providing adequate power to the device they are using. Currently the operator of these devices is provided a single solution to the operation of a device in a remote location. This solution is to provide power to the device from rechargeable batteries.

The batteries appropriate for use by electronic devices present several problems to the user. The user may have no access to a convenient source of electricity necessary to recharge the batteries and must, therefore, bring a large number of batteries into a remote location if power may be required by a long period. Batteries utilized by electronics are expensive, thus requiring a substantial investment to a user having the necessity of more than one battery. Additionally, batteries appropriate for use by electronic devices utilize materials that are harmful to the environment and are hazardous once disposed. For this reason many users of these batteries are uncomfortable with their use. Furthermore, batteries of the type used by electronic devices such as computers are bulky and heavy causing both discomfort and inconvenience during transport. If the user is traveling by foot the problems are greatly exaggerated.

For the forgoing reasons there is a need for a power supply for portable computers and other electronic devices that will provide a reliable source of power for anyone needing to operate such a device in a remote location or less remote location not providing electrical power. There is additionally a need for a power supply that provides reliable power to an electronics device in a clean efficient manner. There is also a need for a power supply that is small, light weight and inexpensive and converts solar energy to electrical power. There is additionally a need for a power supply that conveniently attaches directly to a portable computer or other electronic device and is also easily detachable. There is a need for a power supply of this type to be easily positioned once detached from an electronic device and is stable once positioned.

SUMMARY

The present invention is drawn to a power supply for portable computers and other electronic devices that satisfies the aforementioned need for a power supply that will provide a reliable source of power to an electronic device thus permitting the use of such a device in remote locations. The present invention additionally satisfies the need for a power supply that provides power in a clean efficient manner. The present invention further satisfies the need for an inexpensive power supply that is both small and light weight, and converts solar energy to electrical power. The power supply of the present invention conveniently attaches directly to a portable computer and also detaches from the computer. The power supply also satisfies the need for a power supply to be easily positioned once detached from a computer and is very stable once positioned.

The present invention comprises a power supply for a portable computer or other electronic device of a type having an integral external housing within which the electronic components of the device are encased. The power supply comprises a mounting panel having a front surface and a back surface and an attachment means disposed on the mounting panel to permit temporary attachment of the power supply to the housing of an electronic device. The back surface of the mounting panel faces toward the electronic device housing when the power supply is attached to the housing of the electronic device. At least one solar panel is attached to the mounting panel facing away from the electronic device when the power supply is attached to the housing of the electronic device. The solar panel is capable of producing an electrical power output through the conversion of solar energy to electrical energy. Support means are attached to the power supply for selectively positioning the power supply into an upright inclined position and for maintaining the power supply in the inclined position. The power supply additionally includes power transmission means including connection means to detachably connect the power supply to an electronic device thereby transmitting power. Whereby, upon detachment of the connection means power transmission is ceased to the electronics device. The support means typically comprises a brace. The brace in a first preferred version comprises two vertical members each having a first end pivotally attached to the back surface of the mounting panel and a horizontal member attached to the second ends of the two vertical members for engagement with a surface capable of supporting the power supply when detached from an electronic device. In a second preferred version the brace comprises a panel that is pivotally attached to the power supply. In a specific embodiment, the power supply of the present invention may comprise an attachment to the top cover of a portable computer. The attachment means typically comprises side flange disposed on the mounting panel of the power supply.

The power supply for portable computers and other electronic devices of the present invention provides a number of benefits that heretofore have been unavailable to users of portable computers and other electronic devices. The benefits provided by the present invention are most evident to users interested in using electronic devices in remote areas or other environments or locations where obtaining a reliable power supply is inconvenient.

The first benefit of the power supply of the present invention is the ease in which a user of an electronic device such as a computer can provide a reliable source of power to the device. The present invention utilizes photovoltaic solar panels requiring only an adequate source of sunlight to provide power to an electronic device.

The power supply of the present invention utilizes familiar power cords or cables to transmit power from the photovoltaic solar panels to the portable computer or other electronic device. The attachment of the electronic device to the power source is achieved in a manner that is similar to that of existing power supplies that do not utilize the benefits of photovoltaic solar panels. Because of this simplicity of usage the benefits of the present invention are easily achieved by the user.

Further benefits offered by the power supply of the present invention include that it is of a small size and is also light weight. A portable computer or other electronic device user that must travel with the device or take the device into a remote location will appreciate the compact nature of the invention. Furthermore, the invention adds very little weight or size to a portable computer or other electronic device and eliminates the need to travel with multiple batteries as the portable power source will provide a reliable source of power to the electronic device. The elimination of multiple batteries is also a substantial cost savings to the user and also makes transport of an electronic device easier as the extra weight of extra batteries is eliminated. The elimination of batteries is an attractive benefit to many users as batteries have traditionally been difficult to dispose due to the harmful materials utilized in their construction. The use of sunlight as a source to generate usable power provides easily understood substantial environmental benefits, as well.

Another benefit of the present invention is the ability of the user to recharge a battery at any time an adequate light source is available. The battery to be recharged may be either located internally within an electronic device or external to it for it to receive the benefits of the invention. The user of the portable power supply needs only to place the solar panel assembly of the present invention facing sunlight or in an area receiving sufficient reflected light and attach the power output of the solar panel assembly to a battery to initiate recharging. The portable power supply of the present invention is inexpensive to manufacture, thus making the many benefits it offers easily available to many users of electronic devices.

These and other advantages and benefits of the present invention will become apparent upon the inspection of the accompanying specification, claims, and drawings.

DESCRIPTION

Figure 1:
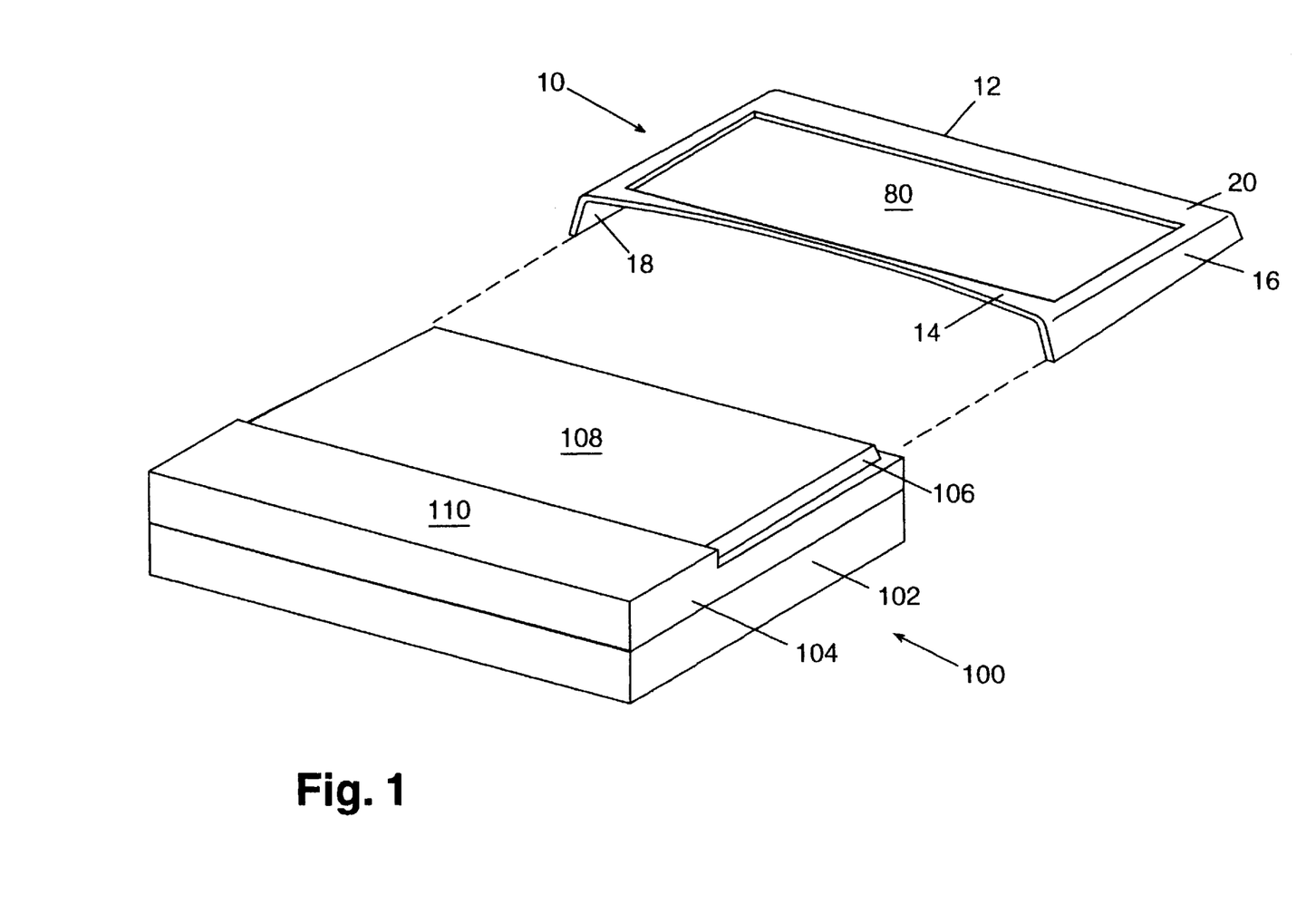
FIG. 1 shows an exploded view of a first preferred version of the power supply of the present invention and a portable computer useable therewith.

In greater detail, FIG. 1 shows the preferred version of the power supply 10, and a portable computer 100 having an external housing adapted for use with the power supply 10. Power supply 10 includes a mounting panel 14 having a front 20. The mounting panel 14 also includes a facing flange 12, a first side flange 16, and a second side flange 18. Facing flange 12, first side flange 16, and second side flange 18 are disposed along the periphery of the mounting panel and extend rearwardly therefrom to partially enclose the back of the mounting panel. Mounting panel 14 includes a rectangular opening therein and within which photovoltaic solar panel 80 is disposed. Computer 100 includes an integral external housing within which the electronic components of the computer are encased. The portable computer further includes a base 102, which includes a CPU and a keyboard (not shown), and a pivotally attached top cover 104 which typically includes a video display (also not shown). The top cover 104 includes a first section 108 adapted for attachment of the power supply 10 and a second section 110 behind the first section. First section 108 includes a recess 106 along a first edge of the top cover that mates with the first side flange 16 of the power supply 10. The top cover first section 108 also would typically include a similar recess on the opposite edge and along the front edge, as well to accommodate the second side flange 18 and the facing flange 12 in a similar manner. As such, first side flange 16 and second side flange 18 comprise the attachment means for the power supply 10 to computer 100. The attachment could be accomplished by a friction fit as is shown in this figure, or could be accomplished by a snap fit, or additional attachment members such as fasteners if desired.

Figure 2:
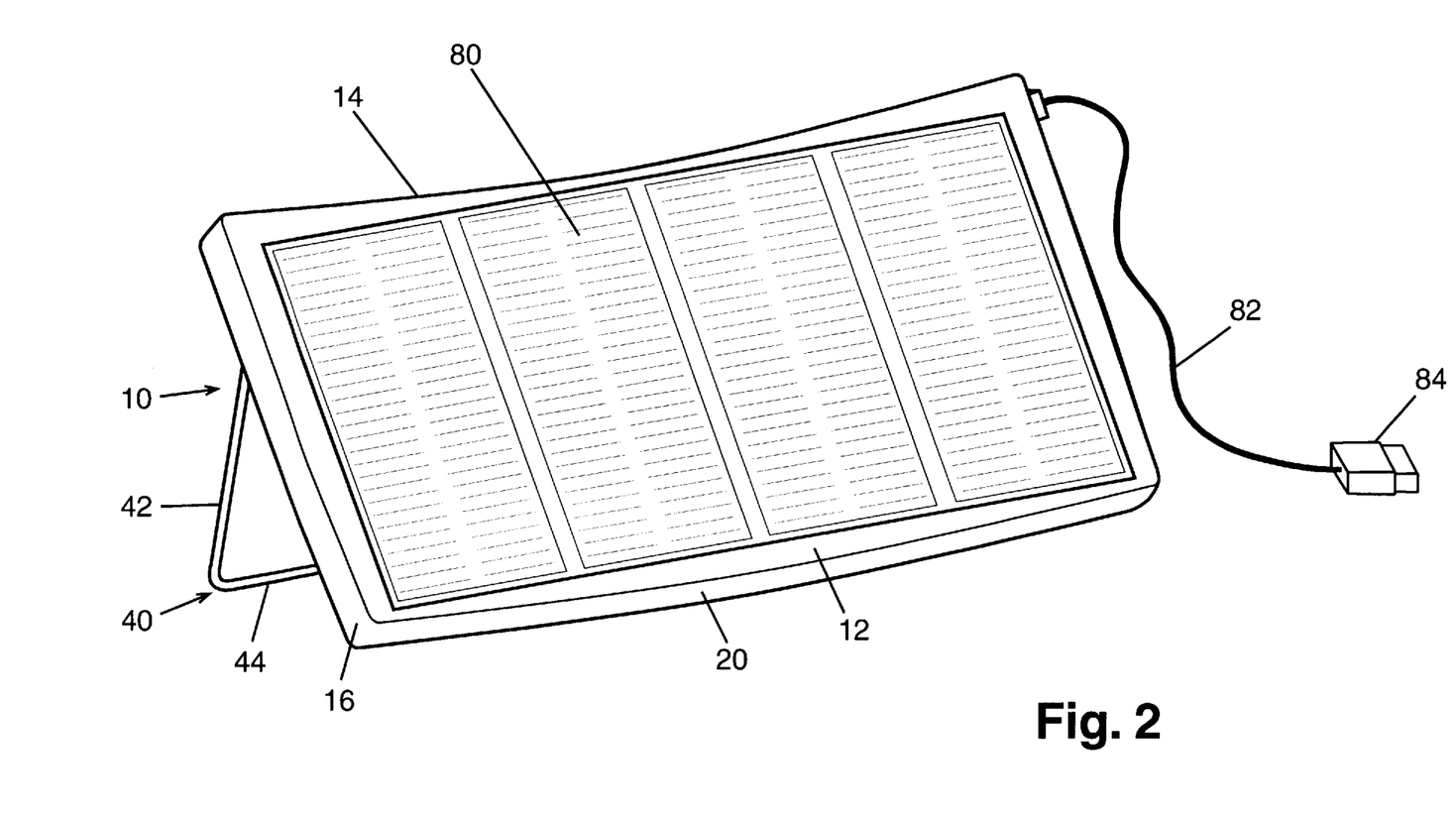
FIG. 2 is a perspective view showing the front of a first preferred version of the power supply detached from a portable computer and in an upright inclined condition.

FIG. 2 shows the front of the preferred version of the power supply 10 detached from a computer and leaning against a support means positioning the power supply in an upright inclined position. FIG. 2 also shows solar panel 80 in a position to best receive light energy to convert to electrical power. The power supply support means comprises a brace 40 which includes horizontal member 44 a first vertical member (not shown in this figure) and a second vertical member 42. The brace vertical member 42 is shown pivoted away form the back of the power supply. The power supply rests on facing panel 12 when maintained in an upright inclined position. FIG. 2 also shows power transmission means comprising power cord 82 and connection plug 84 for connection to a computer or other electronic device. Not shown in FIG. 2 that may be included with the power supply is voltage regulation means for selectively choosing an output voltage from the power supply 10.

Figure 3:
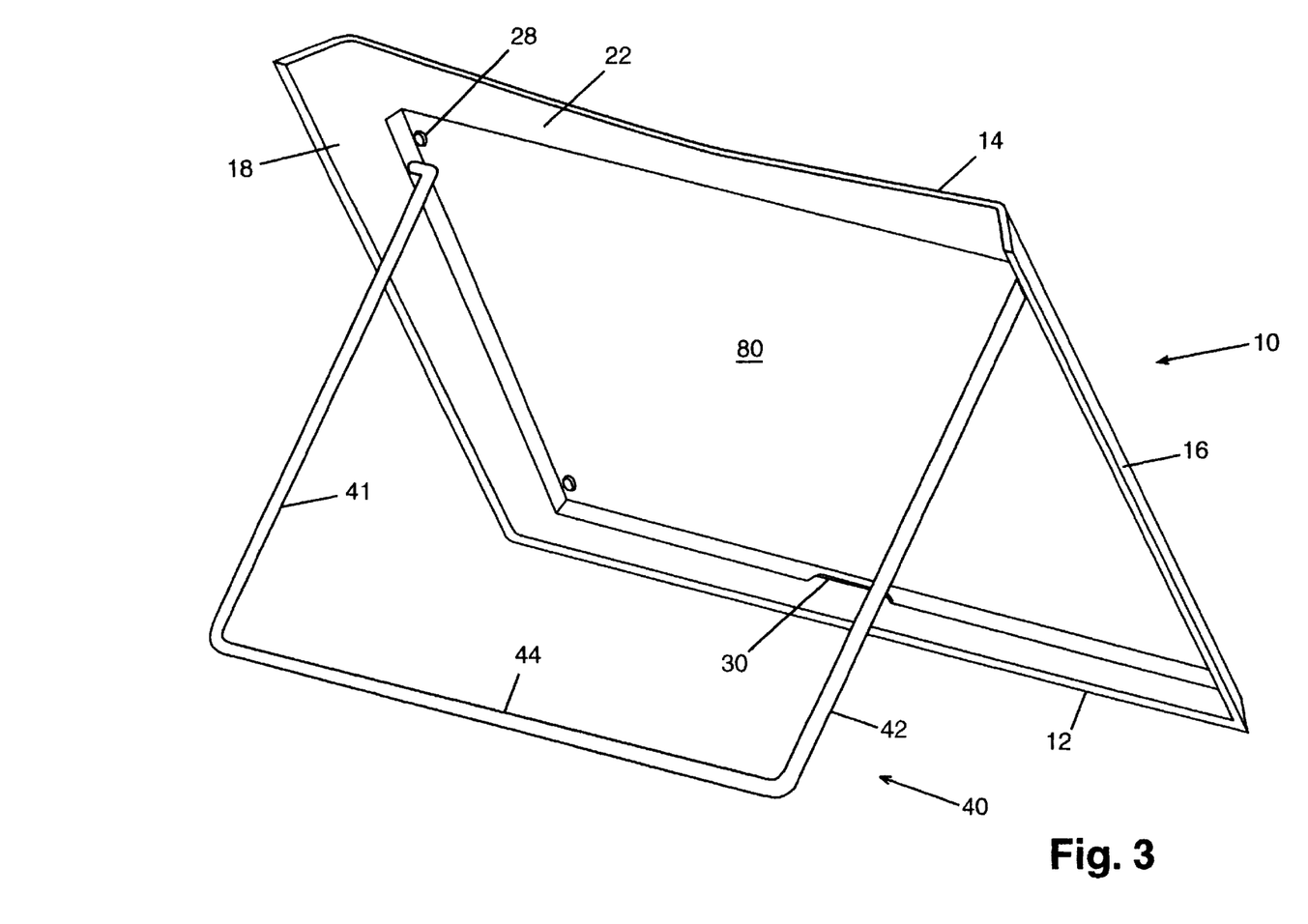
FIG. 3 is a perspective view showing the back of a first preferred version of the power supply detached from a portable computer and in an upright inclined condition.

FIG. 3 shows the back of the power supply in an upright inclined position. The power supply 10 is shown resting against the brace 40 which includes a first vertical member 41, a second vertical member 42, both of which include a first end attached to the mounting panel back side 22. Each vertical member also includes a second end attached to a horizontal member 44 which is disposed intermediate the vertical members. The horizontal member is utilized for engagement with a surface capable of supporting the power supply 10. First vertical member 41 includes a first end 46 disposed at a 90 degree bend from the first vertical member. The first end 46 of the first vertical member 41 is pivotally attached to the back of the mounting panel 14. The brace 40 in this figure comprises a single continuous wire that has been bent into a shape that includes first and second vertical members each having a first end for attachment to the mounting panel 14, and a horizontal member disposed between second ends of the first and second vertical members.

Figure 4:
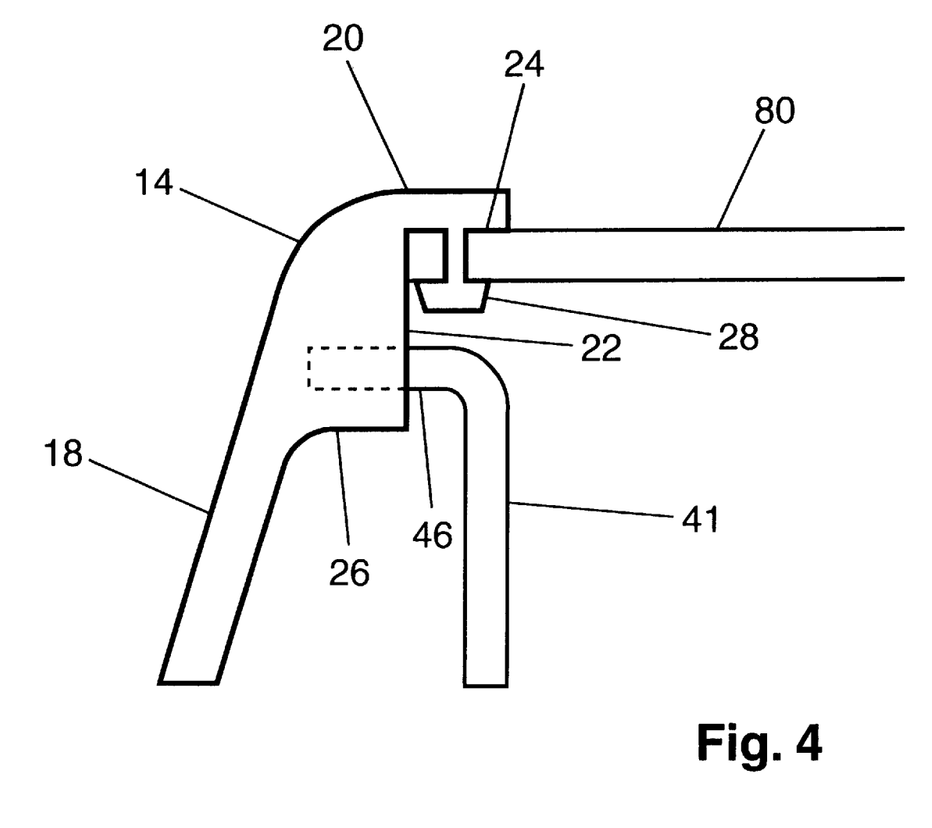
FIG. 4 is an elevation view showing the attachment of the solar panel and brace to the mounting panel.

FIG. 4 shows the details of the attachment of the solar panel 80 and the brace 40 to the mounting panel. Shown in FIG. 4 is the second side flange 18 of the mounting panel included front 20 and back 22. The mounting panel front has a rectangular opening cut therein. Surrounding the periphery of the opening on the back of the mounting panel is a back side attachment surface 24 to which the solar panel 80 is attached by a suitable means such as molded studs 28. Also included in the back of the mounting panel is cylindrical walled cavity 26 for the insertion and retention of the first end 46 of the first vertical member 41 of brace 40. The first end 46 pivots freely in the cavity 26 allowing the selective positioning of the brace 40 in relation to the mounting panel 14.

Figure 5:
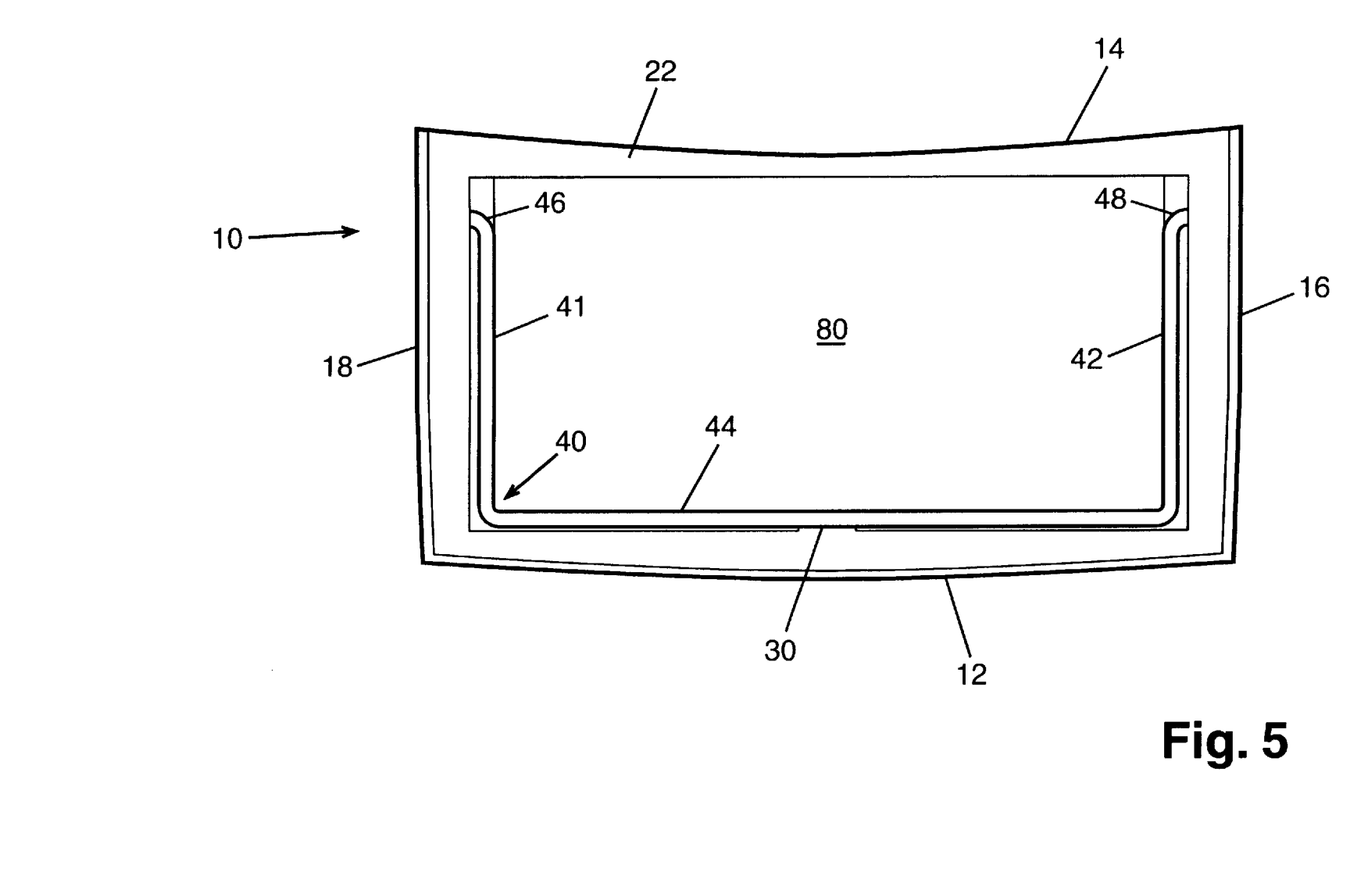
FIG. 5 is a bottom view showing the back side of a first preferred version of the power supply showing the brace in a retracted condition.

FIG. 5 shows the brace 40 retracted into the mounting panel to a position that is adjacent to the back surface of the solar panel 80. Retracting the brace 40 into this position moves the brace 40 into a position where it will not interfere with reattaching the power supply to the computer top. FIG. 5 also shows first end 48 of the second vertical member 42 opposite first end 46 of the first vertical member 41. Also shown in FIG. 5 is a brace retention means which comprises a protrusion 30. The brace retention means requires the user to press slightly the brace to move the brace horizontal member over the protrusion to a position adjacent the back surface of the solar panel where it will be retained.

Figure 6:
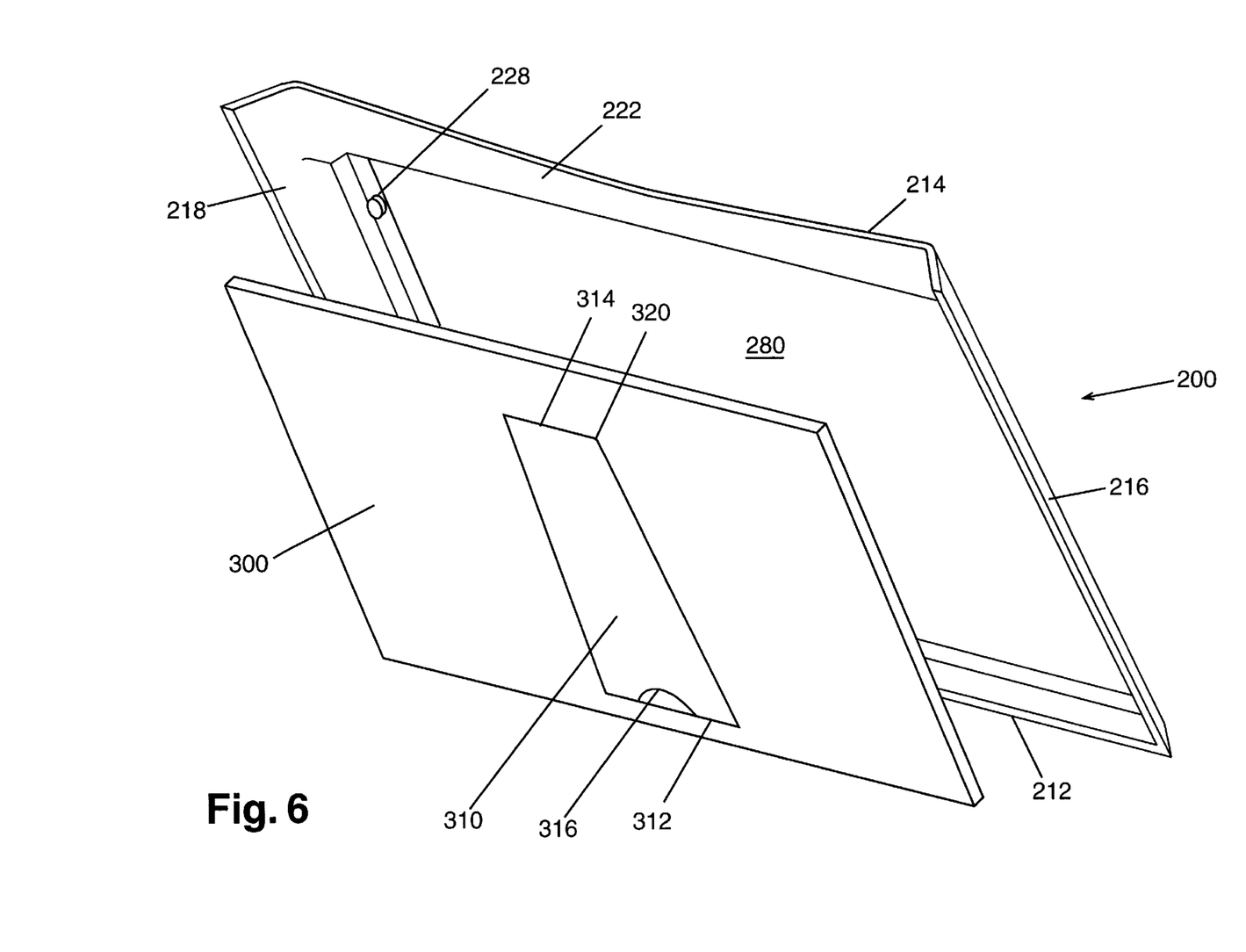
FIG. 6 is an exploded view of a second preferred version of the power supply.

FIG. 6 shows a second preferred version of the power supply 200. This second version of the power supply 200 uses a second version of a brace for supporting the power supply in an inclined upright position. The mounting panel 214 in this version of the power supply is identical to that of the first preferred version. The attachment of the solar panel 280 is also identical to that of the first version as is the operation of the power supply 200.

In this second version of the power supply, the brace comprises a brace panel 310 that is pivotally attached to a brace support panel 300. The brace support panel 300 is typically sized to be disposed within the mounting panel 214 adjacent to the solar panel 280. The brace support panel 300 typically includes an opening therein within which the brace panel 310 is disposed. As shown in FIG. 6 the shape of the brace panel 210 is typically trapezoidal and includes a top 314 and a bottom 312. Adjacent to the top 314 of the brace panel is a hinge 320 that pivotally attaches the brace panel 310 to the brace support panel 300. The brace panel bottom 312 provides a contact surface for engagement with a surface capable of supporting the power supply when detached from an electronic device. The bottom 312 of the brace panel also includes a finger recess 316 that allows the user to remove the brace panel 310 from the opening of the brace support panel 300.

Figure 7:
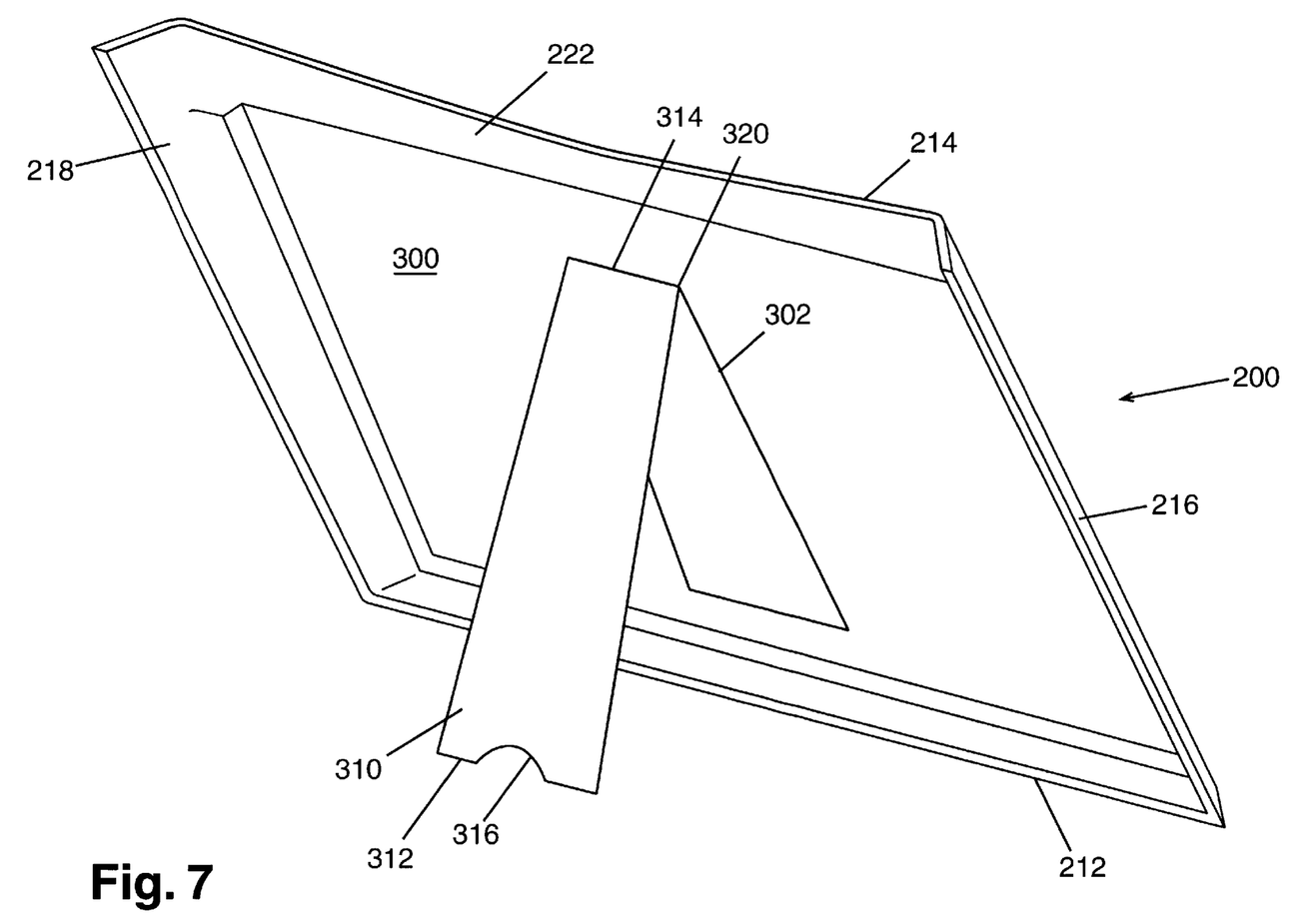
FIG. 7 is a perspective view showing the back of a second version of the power supply.

FIG. 7 shows the back of the power supply 200 in an upright inclined position and also shows the second version of the brace upon which the power supply is resting. In FIG. 7 the brace panel 310 is shown pivoted away from the brace support panel 300. This pivot typically comprises a living hinge formed into the adjoining panels. Brace support panel 300 is shown disposed within the mounting panel 214 and includes opening 302 within which the brace panel is stowed. The brace panel bottom 312 provides a contact surface for the brace panel 310. The brace panel 312 and brace support panel 300 may be formed from a single sheet. As such, the brace panel is cut out of the brace support panel and a living hinge is formed at the top of the brace panel. This living hinge also forms the only attachment of the brace panel to the brace support panel. An alternative arrangement of this brace would be attaching pivoting brace panel to the back of the solar panel directly.

The operation of the power supply of the present invention is quite simple. The user typically removes the power supply from the computer top and positions the solar panel of the power supply in the direction of a light source which is typically sunlight. The user then selects the proper upright angle for the power supply to receive the available light and then pivots the brace into the necessary angle that will maintain the power supply in this inclined upright position. Once positioned, the power supply rests on the brace and the facing flange of the mounting panel. The power cord 82 is then typically attached to the computer or other electronic device by plug 84. Power cord 82 allows for the transmission of power from the power supply to the computer or other electrical device directly or could be used to charge an internal or external battery which powers the device. The external position of the power supply allows for the transmission of power from the power source to an internal or external battery while the power source is mounted to a computer top cover while the top is closed. The power supply 10 is of a durable yet inexpensive construction that will hold up to the rigors of travel.

While preferred embodiments of the power supply has been shown in FIGS. 1 through 7 it is understood that the present invention is not limited to the particular examples described and that modifications and variations can be made without departing from the scope of the invention as defined by the appended claims. Some examples are as follows. Although the preferred version of the invention is prepared for a portable computer, the present invention can be applied for forming the power supply for other electronic devices particularly those having an integral external housing. The attachment means used to secure the power supply to a computer as disclosed comprises side flanges disposed on the mounting panel of the power supply. Other structural variations for attaching the power supply to an electronic device could comprise the use of metal or plastic fasteners, hook and loop fasteners, or other well known fasteners in addition to the side flanges or in substitution of the side flanges.

We claim:

1. A power supply for an electronic device of a type having an integral external housing within which the electronic components of the device are encased, the power supply comprising:

a mounting panel having a front surface and a back surface;

attachment means disposed on the mounting panel to permit temporary attachment of the power supply to the housing of an electronic device, and to permit a detachment of the power supply from the housing of an electronic device;

wherein the back surface of the mounting panel faces toward the electronic device housing when the power supply is attached to the housing of the electronic device;

a solar panel attached to the mounting panel and facing away from the electronic device when the power supply is attached to the housing of the electronic device; wherein the solar panel is capable of producing an electrical power output through the conversion of solar energy to electrical energy;

support means attached to the power supply for selectively positioning the power supply into an upright inclined position and for maintaining the power supply in the inclined position when the power supply is detached from the housing of an electronic device, wherein the power supply when detached from the housing can be selectively placed for maximum solar exposure while remaining electrically connected to the electronic device through the power transmission means;

power transmission means including connection means to detachably connect the power supply to an electronic device thereby transmitting power; whereby, upon detachment of the connection means power transmission is ceased.

2. The power supply of claim 1, wherein the support means comprises a brace.

3. The power supply of claim 2, wherein the brace comprises first and second vertical members each having a first end pivotally attached to the back surface of the mounting panel, and a second end opposite the first end; a horizontal member attached to the second ends of the two vertical members for engagement with a surface capable of supporting the power supply when detached from an electronic device.

4. The power supply of claim 2, additionally comprising a brace support panel attached to the back of the mounting panel; and wherein the brace comprises a brace panel pivotally attached to the brace support panel;

the brace panel further including a top and a bottom, wherein the bottom provides a contact surface for engagement with a surface capable of supporting the power supply when detached from an electronic device;

a hinge attaching the top of the brace panel to the brace support panel.

5. The power supply of claim 4, wherein the brace support panel includes an opening therein, and the brace panel substantially fits within the brace support panel opening.

6. The power supply of claim 1, wherein the attachment means comprise side flanges disposed on the mounting panel.

7. A power supply for a portable computer of a type having an integral external housing within which the electronic components of the device are encased, and including a base including a CPU and a keyboard, and a pivotally attached top cover including a video display, the power supply comprising:

a mounting panel having a front surface and a back surface;

attachment means disposed on the mounting panel to permit temporary attachment of the power supply to the top cover of a computer and to permit a detachment of the power supply from the top cover of the computer;

wherein the back surface of the mounting panel faces toward the top cover of the computer when the power supply is attached to the top cover of the computer;

a solar panel attached to the mounting panel and facing away from the computer when the power supply is attached to the computer; wherein the solar panel is capable of producing an electrical power output through the conversion of solar energy to electrical energy;

support means attached to the power supply for selectively positioning the power supply into an upright inclined position and for maintaining the power supply in the inclined position when the power supply is detached from the top cover of a computer, wherein the power supply when detached from the top cover can be selectively placed for maximum solar exposure while remaining electrically connected to the computer through the power transmission means;

power transmission means including connection means to detachably connect the power supply to a portable computer thereby transmitting power; whereby, upon detachment of the connection means power transmission is ceased.

8. The power supply of claim 7, wherein the support means comprises a brace.

9. The power supply of claim 8, wherein the brace comprises two vertical members each having a first end pivotally attached to the back surface of the mounting panel, and a second end opposite the first end; a horizontal member attached to the second ends of the two vertical members for engagement with a surface capable of supporting the power supply when detached from a portable computer.

10. The power supply of claim 8, additionally comprising a brace support panel attached to the back of the mounting panel; and wherein the brace comprises a brace panel pivotally attached to the brace support panel;

the brace panel further including a top and a bottom, wherein the bottom provides a contact surface for engagement with a surface capable of supporting the power supply when detached from an electronic device;

a hinge attaching the top of the brace panel to the brace support panel.

11. The power supply of claim 10, wherein the brace support panel includes an opening therein, and the brace panel substantially fits within the brace support panel opening.

12. The power supply of claim 7, wherein the attachment means comprise side flanges disposed on the mounting panel.

* * * * *